April 20, 1937. H. J. WOOCK 2,077,506
ADJUSTABLE RIM
Filed Sept. 9, 1935

INVENTOR
H. J. Woock
BY
ATTORNEY

Patented Apr. 20, 1937

2,077,506

UNITED STATES PATENT OFFICE 2,077,506

ADJUSTABLE RIM

Herbert J. Woock, Lodi, Calif., assignor, by mesne assignments, to Super Mold Corporation of California, a corporation of California Application September 9, 1935, Serial No. 39,690

5 Claims. (Cl. 18—38)

This invention relates to adjustable tire supporting rims for use in connection with vulcanizing molds, and represents improvements over the rims of the same character shown in Patent No. 1,913,739 dated June 13, 1933, and Patent No. 1,928,404 dated September 26, 1933.

The principal object of the present invention is to provide an adjustable rim for this purpose consisting of a pair of relatively movable members so connected together that the opposed bead engaging flanges of the rim may be readily adjusted to different positions, and so that a tire can be easily and quickly mounted thereon or removed therefrom. Also none of the rim parts project any further from the bead engaging flanges when engaging a small tire than when engaging a large tire—a feature differing from the previous devices, as will be evident, and which makes for more convenient manipulation of the tire and rim as a unit when placing the same in a mold.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
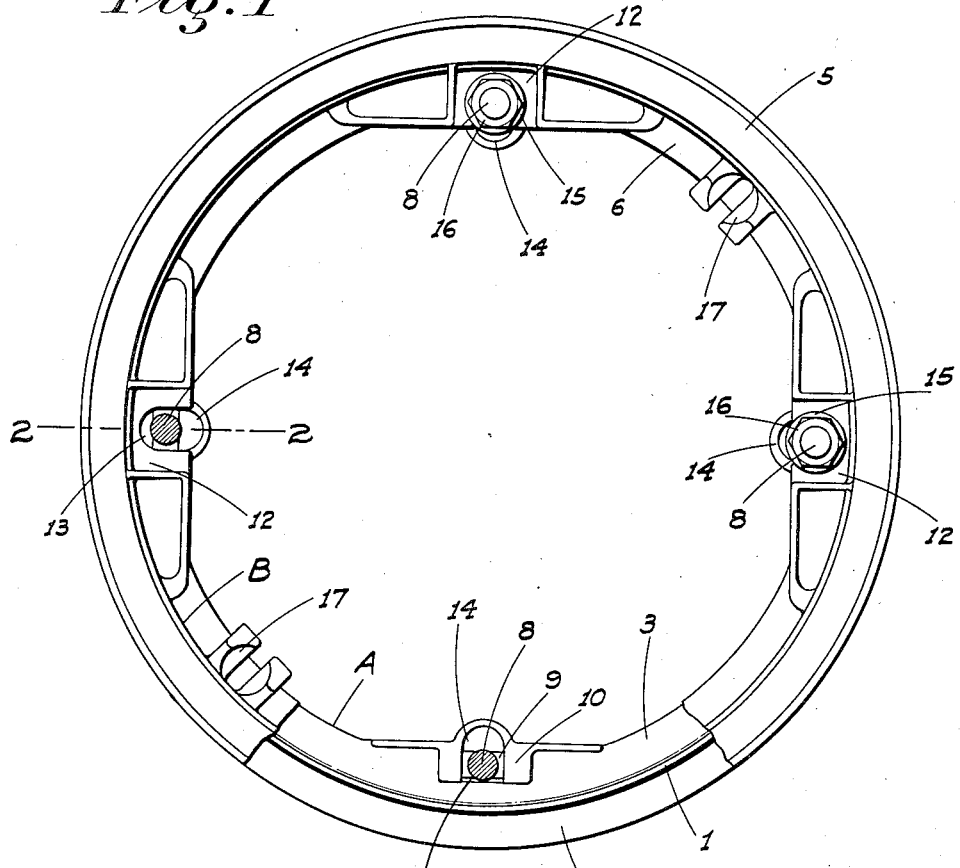
Figure 1 is a top plan view of my improved rim, certain parts being broken out or in section.

Referring now more particularly to the characters of reference on the drawing, the rim consists of separate endless circular members A and B. The member A comprises an endless band 1 having a bead engaging flange 2 projecting outwardly from its outer lower edge, and an annular stiffening flange 3 projecting inwardly from said edge of the band. The external diameter of the band 1 is such as to fit the beads of a tire of that rim size for which the rim is designed.

The member B comprises an endless band 4 adapted to slidably fit inside the band 1 from above the same and formed with a bead engaging flange 5 disposed in opposed relation to the flange 2 and projecting outwardly from the upper edge of said band 4. The band 4 is also provided with an annular stiffening flange 6 projecting inwardly from said band near its lower edge. The band 4 is also formed at the base of the flange 5 with an endless circular ledge 7 of the same diameter as the external diameter of the band 1, so as to form a seat for the adjacent tire bead. When the adjacent edges of the ledge 7 and the band 1 abut the flanges 2 and 5 are of course disposed as close together as possible and will then engage a tire of the smallest size for which the rim is intended.

The members A and B are adjustably and removably connected together by a plurality of T-bolts 8, whose heads 9 are of circular form and are turnably mounted in bosses 10 formed in the flange 3 to the sides of slots 11 in said flange. The heads 9 are disposed so that the bolts may swing inwardly and radially of the rim from a vertical position or one in which they are parallel to the axis of the rim. The bolts when vertically disposed project through reinforced ears 12 formed with the flange 6 and which are provided with inwardly opening slots 13 disposed radially of the rim.

To aid in holding the bolts in a vertical position, their heads 9 are flattened on the bottom as at F, the flattened portions being engaged, when the bolts are vertical, by leaf springs S secured on the flange near bead 2.

Figure 2:
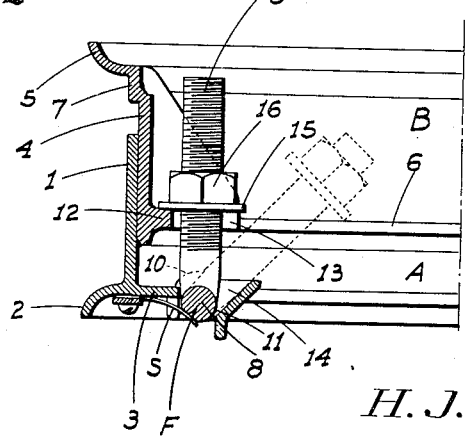
Figure 2 is a fragmentary enlarged sectional elevation of the rim taken on the line 2—2 of Figure 1.

By reason of this construction the bolts may be swung inwardly and down to clear the ears so as to permit of the removal of the member B in an upward direction; such movement of the bolts being limited by cradles 14 formed as inward extensions of the slots 11, as shown in Figure 2. Relatively large washers 15 on the bolts are adapted to engage the upper surface of the ears and nuts 16 are adjustably mounted on the bolts above the washers. The nuts are preferably turned down or advanced on the bolts by a special wrench so that the spacing of the bead flanges of the two rim members may be accurately controlled.

In operation to mount a tire on the rim, said rim is laid on the floor with the member A lowermost. The bolts are then swung in clear of the ears 12 and the member B is then lifted out. The tire is then slipped into position on the member A and the member B replaced. The bolts are then swung upwardly into the ears 12 and the nuts are turned down to a position determined by the size of the tire and the spacing desired to be maintained between the bead flanges. When the tire is then inflated a separating pressure is thus imparted to the tire beads, which of course tends to force the rim members apart—an action which is limited by the position of the nuts on the connecting bolts as will be evident.

As an additional feature to aid in the lifting of the rim and a heavy tire mounted therein into and out of a mold, the band of the member B above the flange 6 may be provided with opposed chain-link holding bosses 17.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An adjustable rim comprising inner and outer bands slidably engaging each other for relative movement in an axial direction, the outer band being adapted to fit within the beads of a tire, bead engaging flanges projecting outwardly from the opposite edges of the bands, adjustable bolts permanently pivoted on the outer band inwardly thereof adjacent the plane of its bead engaging flange and adapted when in operation to lie parallel to the axis of the rim, lugs projecting inwardly from the inner band in a plane adjacent the edge of the same opposite its bead engaging flange and through which the bolts may removably project when swung on their pivots, and adjustable nuts on the bolts beyond the lugs.

2. An adjustable rim comprising inner and outer bands slidably engaging each other for relative movement in an axial direction, the outer band being adapted to fit within the beads of a tire, bead engaging flanges projecting outwardly from the opposite edges of the bands, adjustable bolts swivelly mounted on the outer band inwardly thereof adjacent the plane of its bead engaging flange for radial swinging movement inwardly from a position parallel to the axis of the rim, lugs projecting inwardly from the other band and having slots radially of and open toward the axis of the rim through which the bolts may be swung to and from said parallel position, and adjustable nuts on the bolts beyond the lugs.

3. A structure as in claim 2, with means engaging the bolts after they have been swung inwardly to a predetermined position clear of the lugs to limit such inward swinging movement of the bolts.

4. A structure as in claim 2, with cradles mounted on the outer band adjacent the points of connection of the bolts therewith and projecting inwardly therefrom to engage the adjacent portions of the bolts after the latter have been swung inwardly a predetermined amount.

5. A structure as in claim 2, with springs mounted on the outer band and acting on the bolts to yieldably hold the same in position in the lug-slots.

HERBERT J. WOOCK.